United States Patent [19]

Sugiyama et al.

[11] Patent Number: 4,887,623
[45] Date of Patent: Dec. 19, 1989

[54] APPARATUS FOR REMOVING PARTICLES FROM A FLEXIBLE SUPPORT

[75] Inventors: Tuyoshi Sugiyama; Hideo Takeda; Tsunehiko Sato; Hiroshi Chikamasa, all of Kanagawa, Japan

[73] Assignee: Fuji Photo Film Co., Ltd., Kanagawa, Japan

[21] Appl. No.: 68,294

[22] Filed: Jul. 1, 1987

Related U.S. Application Data

[62] Division of Ser. No. 901,500, Aug. 28, 1986.

[30] Foreign Application Priority Data

Sep. 12, 1985 [JP] Japan .................. 60-200662
Sep. 12, 1985 [JP] Japan .................. 60-200663

[51] Int. Cl.$^4$ ............................... B08B 1/02
[52] U.S. Cl. .................. 134/64 R; 15/256.5;
    15/256.52; 118/118; 134/111; 134/122 R
[58] Field of Search ............ 134/64 R, 64 P, 111,
    134/122 R, 122 P; 68/202; 15/302, 306 A,
    256.5, 256.52; 118/118, 246, 259; 354/318;
    355/10

[56] References Cited

U.S. PATENT DOCUMENTS

| 2,918,393 | 12/1959 | Wommack et al. | 118/259 X |
| 3,640,203 | 2/1972 | Raab et al. | 354/318 |
| 3,956,790 | 5/1976 | Ishiwata et al. | 134/64 PX |
| 4,518,637 | 5/1985 | Takeda et al. | 118/118 X |
| 4,577,362 | 3/1986 | Tanaka et al. | 15/256.5 |

FOREIGN PATENT DOCUMENTS

6974 1/1984 Japan ..................... 15/256.5

*Primary Examiner*—Philip R. Coe
*Attorney, Agent, or Firm*—Sughrue, Mion, Zinn, MacPeak and Seas

[57] ABSTRACT

A method and apparatus for removing particles from a flexible sheet. The sheet is run over a rotating rod, rotating oppositely to the moment of the sheet. The rod is immersed on its lower side in a bath of solvent and excess solvent is removed from the bath and is filtered. Additionally, solvent may be applied to the sheet before it reaches the rotating rod or a negative pressure applied just upstream of the rod sucks away the particles.

10 Claims, 2 Drawing Sheets

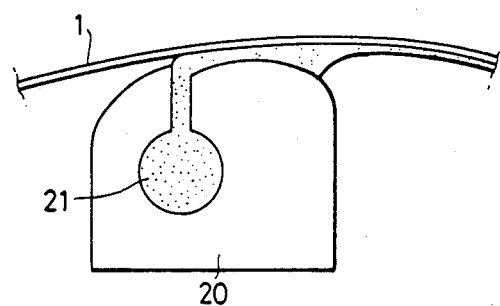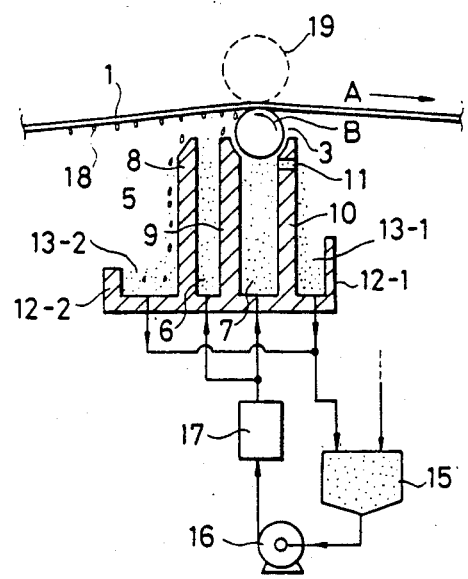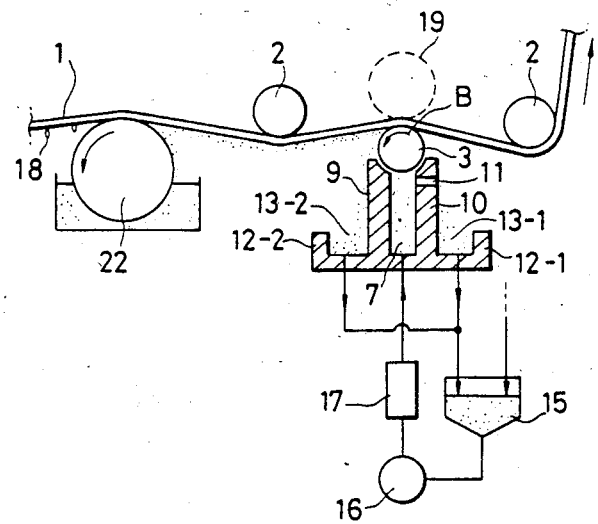

APPARATUS FOR REMOVING PARTICLES FROM A FLEXIBLE SUPPORT

This is a division of application Ser. No. 901,500 filed Aug. 28, 1986.

BACKGROUND OF THE INVENTION

1. Field of the Invention

This invention relates to a method of removing particles such as foreign matter and dust from a flexible support (hereinafter referred to merely as "a support"), and an apparatus for practicing the method (hereinafter referred to as "a dust removing apparatus").

2. Terminology

The term "support" as used herein is intended to mean a flexible belt-shaped article having a width of several centimeters to several meters, a length of more than several tens of meters, and a thickness of several micrometers to several hundreds of micrometers. The belt-shaped article is made of a plastic film of polyethylene terephthalate, polyethylene-2, 6-napthalate, cellulose diacetate, cellulose triacetate, cellulose acetate propionate, polyvinyl chloride, polyvinylidene chloride, polycarbonate, polyimide or polyamide. Alternatively, the belt-shaped article is paper coated or laminated with α-polyolefin such as polyethylene, polypropylene or ethylene butane copolymer or is a metal foil of aluminum, copper or tin. The flexible belt-shaped product includes one on which a preliminary manufactured layer is formed.

The support is coated with a coating solution such as a photo-sensitive coating solution, a magnetic coating solution, a surface-protecting coating solution, a charging-preventing coating solution, or a smoothing coating solution, depending on its purpose of use. After the coating solution thus applied has been dried, the support is cut into pieces having a predetermined length and width. Typical examples of the product are photographic films, photographic papers, and magnetic tapes.

However, this terminology is by way of example only and is not intended to limit the invention.

BACKGROUND ART

In a conventional method of removing particles, such as foreign matter or dust from a support (hereinafter referred to as "a dust removing method"), a piece of unwoven cloth or blade suitably held is pushed against the support so that the particles are caught by the piece of unwoven cloth or blade. In another conventional dust removing method, a stream of clean air is applied to the support at high speed so that the particles are separated from the support and led to a suction port. These methods are of dry type. On the other hand, a wet type dust removing method has been known in the art in which the support is immersed in a washing solution tank, in which the particles are separated from the support by ultrasonic vibration. In another conventional wet type dust removing method, a washing solution is applied to the support, and an air stream is applied to the support at high speed and sucked therefrom (cf. Japanese Patent Application Publication No. 13020/1974).

The above-described conventional dust removing methods still suffer from several disadvantages.

For instance, in the method in which the particles are caught by the unwoven cloth or blade, the support may be scratched or electrostatically charged by the friction, or the fibers of the unwoven cloth may stick to the support.

The dust removing method using the high speed air stream is effective in removing relatively large particles of several tens of micrometers or more from the support. However, it is scarcely effective in catching relatively small particles or particles strongly adhering to the support.

In the wet type dust removing methods, the equipment is large in scale. Furthermore, in removing particles from the support running at high speed, a large quantity of mist is produced which sticks to the peripheral devices and to the support from which the particles have been removed.

In order to eliminate the above-described difficulties the present applicant has proposed a dust removing method (Japanese Patent Application (OPI) No. 150571/1984, the term "OPI" as used herein meaning an "unexamined published application"). In this method, as shown in FIGS. 1 and 2, a solvent is applied to the surface of a support 1. While the solvent remains on the support 1, two stationary plates are pushed against the surface of the support 1 to remove the particles 18 together with a part of the solvent from the support.

Thereafter, the inventor has conducted intensive research on a more effective dust removing method and an apparatus for practicing the method, and accomplished the present invention.

SUMMARY OF THE INVENTION

In view of the above-described difficulties accompanying a conventional method of removing particles such as foreign matter or dust from a flexible support, an object of this invention is to provide an apparatus for removing particles such as foreign matter and dust from a flexible support.

The foregoing object and other objects of this invention have been achieved by the provision of a method of removing particles from a flexible support in which, according to the invention, the solvent-wetted surface of a rod member rotating in a direction opposite to direction of running of the flexible support is set close to one side of the flexible support so that the particles on the one side of the support are transferred onto the outer cylindrical surface of the rod member, and separated from the outer cylindrical surface of the rod member.

The invention further provides an apparatus for removing particles from the flexible support in which the solvent-wetted surface of the rod member rotating in a direction opposite to the direction of running of the flexible support is set close to one side of the support so that the particles on the one side of the support are transferred onto the outer cylindrical surface of the rod member and separated from the outer cylindrical surface of the rod member. According to the invention, the apparatus comprises a rod member connected to a rotating drive source so as to be rotated in a direction opposite to the direction of running of the flexible support and a block member having both a slit in which a negative pressure can be maintained and a slit into which a solvent can be supplied. The block member is able to rotatably hold the rod member. Alternatively, instead of the negative pressure, solvent can be applied to the support before it reaches the rod member.

It is preferable that the outside diameter of the rod member is in a range of from 1 mm to 50 mm.

BRIEF DESCRIPTION OF THE DRAWINGS

FIG. 5 is an explanatory diagram outlining a coating apparatus used for determining the effect of the invention.

FIG. 6 is a sectional diagram, partly as a block diagram, showing a second example of the dust removing apparatus according to the invention.

FIG. 7 is a sectional diagram, partly as a block diagram, showing a third example of the dust removing apparatus according to the invention.

DETAILED DESCRIPTION OF THE PREFERRED EMBODIMENTS

Preferred embodiments of this invention will be described with reference to the accompanying drawings.

Figure 1:
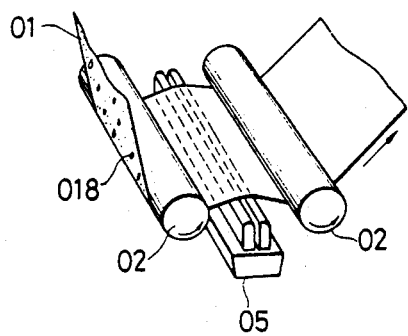
FIG. 1 is a perspective view showing a part of a dust removing apparatus.
Figure 2:
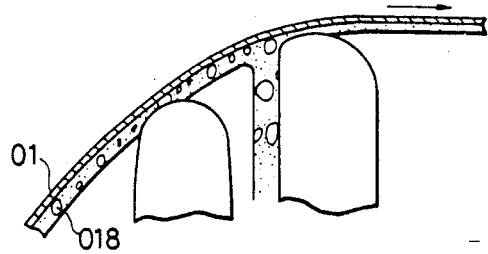
FIG. 2 is a sectional view showing a part of the apparatus in FIG. 1.
Figure 3:
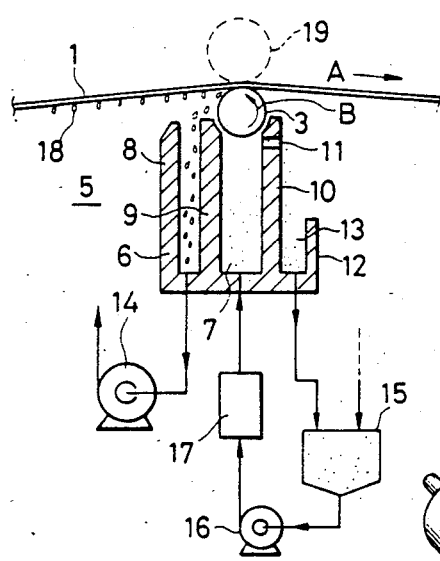
FIG. 3 is a sectional view, partly as a block diagram, showing a first example of a dust removing apparatus according to this invention.
Figure 4:
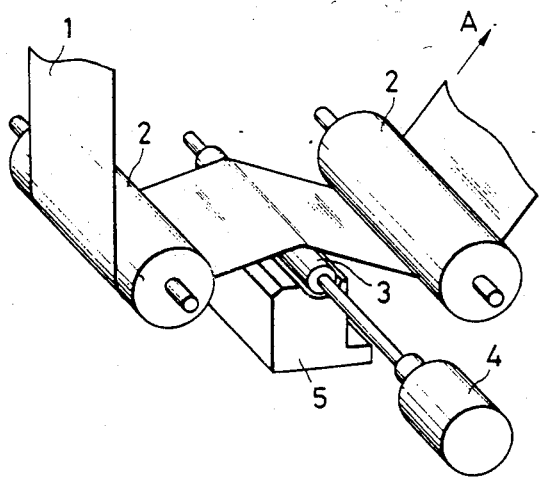
FIG. 4 is a perspective view showing a part of the apparatus of FIG. 3.

FIG. 3 is a sectional view showing a first example of an apparatus for removing dust from a flexible support according to the invention, and FIG. 4 is a perspective view showing an operating state of the apparatus.

A flexible support 1 laid over a plurality of guide rollers 2 is conveyed in a predetermined direction in the direction of the arrow A.

A rod 3 is disposed between the aforementioned guide rollers 2 and 2 in such a manner that it contacts the surface of the support 1 at a small lap angle and is rotated at a considerably low speed in the direction B opposite to the running direction A of the support 1. The peripheral speed of the rod 3 is at least 0.1 cm/sec.

In order to rotate the rod 3, any drive source 4 may be employed if it can provide a low speed rotation output. However, it is preferable to employ an oil pressure motor or an air pressure motor for environment security against solvent gas.

In general, the rod 3 is 1 to 50 mm in diameter, and at least its surface is composed of cemented carbide (such as WC-TAC) or fine ceramics such as alumina A-150 or zirconia) and has a surface roughness of 1 micrometers to 0.05 micrometer in $R_{max}$. The length of the rod 3 is longer than the width of the support 1.

The rod 3 is rotatably supported by a block 5 whose width is substantially equal to the length of the rod 3.

The block 5 includes partitions 8, 9 and 10 which form slits 6 and 7 as shown in FIG. 3.

The upper ends of the partitions 9 and 10 are curved surfaces whose radius of curvature is substantially equal to the radius of the rod 3 in order to hold the rod 3. In the partition 10, a plurality of liquid outlet holes 11 are formed at suitable intervals in such a manner that they are arranged horizontally near the top.

A liquid pool 13 is provided outside of the partition 10. In other words, the block 5 includes an outside wall 12 to form the liquid pool 13 against the partition 10.

The slit 6 communicates through its bottom to an exhaust blower 14 so that the air pressure in the slit 6 is maintained −20 to −100 mm-aq., that is, a negative pressure relative to atmospheric pressure as measured in millimeters of water.

On the other hand, the slit 7 communicates with a solvent supplying system consisting of a solvent supplying tank 15, a pressurizing pump 16 and a filter 17, so that the slit 7 is filled with a solvent, such as xylole or butyl acetate. A larger part of the solvent flows through the liquid outlet holes 11 into the liquid pool 13, and is returned into the solvent supplying tank 15 when necessary. Additional solvent is supplied to the supplying tank 15 to compensate for solvent loss.

The apparatus thus constructed operates as follows.

The support 1 is run in the direction of the arrow A. When particles 18 such as dust stuck to the surface of the support 1 approach the surface of the rod 3 rotating in the direction B opposite to the direction of running of the support 1, they are separated from the surface of the support 1 by the rotation of the rod 3 and the air flow accompanying the support. As a result, the particles are transferred onto the surface of the rod 3, and are then delivered to the upper end of the slit 6 by the rotation of the rod 3.

When the particles are delivered to the upper end of the slit 6, as was described above, most of the particles are separated from the surface of the rod 3 and sucked into the slit 6 by the negative pressure in the slit 6. The particles 18 thus sucked are discharged through the exhaust blower 14.

On the other hand, some of the particles 18 remaining on the surface of the rod 3 are separated form the rod 3 by the washing action of the solvent supplied into the right-hand slit 7 while passing over the upper end of the slit 7. The particles thus separated are discharged through the liquid outlet holes 11.

The rod 3 covered with the solvent is continuously rotated, which increases the effect that the particles 18 are transferred onto the surface of the rod 3.

In the lap region of the support 1 and the rod 3, a small gap is formed therebetween by the air accompanying the support 1. The small gap thus formed permits the passage of fine particles. That is, it is difficult to completely remove the fine particles from the support because of the small gap thus formed. Therefore, it is desirable that a backing roll 19 confronts the rod 3 with the support 1 therebetween, as indicated by the broken line 19, as the case may be.

In the case where a number of particles 18 have adhered to the support 1, they are liable to transfer onto one and the same part of the surface of the rod 3. If this is repeated, then the gap between the support and the rod is locally increased to permit the passage of particles. That is, it becomes impossible to completely remove the particles from the support 1. In order to eliminate this difficulty, it is desirable to provide means for reciprocally sliding at least the rod in the
widthwise direction of the support.

SPECIFIC EXAMPLE

The dust removing apparatus as shown in FIG. 3 using a xylole solvent was used to remove dust from one side of a support of polyethylene terephthalate of 38 micrometer in thickness and 500 mm in width which was run at a speed of 200 m/min. After the dust was removed from the support, a coating apparatus 20, as shown in FIG. 5 and disclosed in Japanese patent application No. 94657/1984, was used to coat the one side of the support 1 with the magnetic coating solution whose composition is indicated in the following Table 1. The support 1 was coated by the magnetic coating solution to thicknesses of 3 micrometers, 5 micrometers and 10 micrometers. The coated surface was then checked for pin holes and stripes.

The rod 3 of the dust removing apparatus was made of carbide (WC-TAC), and had a diameter of 6 mm and a surface roughness of 0.5 micrometer in $R_{max}$. The rod was rotated at a peripheral speed of 0.5 cm/sec.

The pressure in the slit 6 was −60 mm-aq. and the flow rate of xylole supplied to the slit 7 was 500 cc/min.

The magnetic coating solution was prepared as follows. The materials shown in Table 1 were sufficiently mixed and dispersed in a ball mill, and mixed with epoxy resin (epoxy equivalent 500) of 30 parts by weight. The resultant mixture was further subjected to mixing and dispersing, to prepare the magnetic coating solution.

TABLE 1

| | |
|---|---|
| Y-Fe$_2$O$_3$ powder (needle-shaped particles having an average powder diameter of 0.5 micrometer in the major diameter direction; a coercive force of 320 Oe) | 300 parts by weight |
| Vinyl chloride vinyl acetate copolymer (copolymerization ratio 87:13, polymerization degree 400) | 30 parts by weight |
| Electrically conductive carbon | 20 parts by weight |
| Polyamide resin (amine value 300) | 15 parts by weight |
| Recithin | 6 parts by weight |
| Silicon oil (dimethyl polysiloxane) | 3 parts by weight |
| Xylole | 300 parts by weight |
| Methyl isobutyl ketone | 300 parts by weight |
| n-butanole | 100 parts by weight |

The results are as indicated in Table 2 below.

COMPARISON EXAMPLE

For a comparison, the magnetic coating solution was applied to the support under the same conditions as those of the above-described specific examples except that the dust removing apparatus was not used. The coated surface of the comparison example was then checked for pin holes and stripes. The results are as indicated in Table 2 below:

TABLE 2

| | Dust removing apparatus | Defect | Coated magnetic layer thickness | | |
|---|---|---|---|---|---|
| | | | 3 μm | 5 μm | 10 μm |
| Specific example | Used | Stripes | 0.2 | 0 | 0 |
| | | Pin holes | 0.6 | 0.2 | 0 |
| Comparison example | Not used | Stripes | 10.2 | 6.5 | 4.8 |
| | | Pin holes | 85.1 | 41.3 | 35.3 |

Note
In both the specific example and the comparison example, ten supports each of a length of 4000 m were used. The data in Table 2 indicate the numbers of defects per support.

Now, a second embodiment of the invention will be described. The embodiment provides a method of removing particles from a flexible support, in which one side of the flexible support is coated with a solvent. A solvent-wetted surface of a rod member rotating in a direction opposite to the direction of running of the support is set close to the one side of the support while the solvent also remains on the support. As a result, the particles on the one side of the support are transferred onto the outer cylindrical surface of the rod member and are then separated from the outer cylindrical surface of the rotating rod member. The embodiment further provides an apparatus for practicing the method.

A second example of the dust removing apparatus according to the invention will be described with reference to FIG. 6. In FIG. 6, those components which have been previously described with reference to FIG. 3 (the first example) are designated by the same reference numerals or characters.

As shown in FIG. 6, the apparatus has a block 5 having partitions 8, 9 and 10 which form slits 6 and 7.

Liquid pools 13-1 and 13-2 are provided outside of the partitions 8 and 10 on either side of the block 5. In other words, the block 5 includes outside walls 12-1 and 12-2 to form the liquid pools 13-1 and 13-2 against the outer partitions 8 and 10.

On the other hand, the slits 6 and 7 communicate with a solvent supplying system consisting of a solvent supplying tank 15, a pressurizing pump 16 and a filter 17, and are filled with a solvent, such as xylole or butyl acetate. A larger part of the solvent is discharged through the liquid outlet holes 11 into the liquid pools 13-1 and 13-2. The solvent in the liquid pools 13-1 and 13-2 is returned into the solvent supplying tank 15 when necessary.

In the apparatus thus constructed, the support 1 is run in the direction of the arrow A. When the particles 18 stuck to the surface of the support 1 approach the surface of the rod 3 rotating in the direction B opposite to the direction of the arrow A, the particles are separated from the surface of the support 1 by the rotation of the rod 3 and the action of the solvent applied to the support 1 from the slit 6 and the particles are transferred onto the surface of the rod 3. The particles thus transferred are brought to the upper end of the slit 6 as the rod 3 rotates.

On the other hand, the particles 18 transferred onto the surface of the rod 3 as described above are separated from the surface of the rod 3 by the washing action of the solvent supplied into the slits 6 and 7 while the solvent passes over the upper ends of the slits 6 and 7. The particles thus separated are discharged through the upper region of the slit 6 and through the liquid outlet holes 11.

The rod 3 covered with the solvent is continuously rotated, which action further increases the effect that the particles 18 are transferred onto the surface of the rod 3.

FIG. 7 shows a third example of the dust removing apparatus according to the invention. In the apparatus, a solvent applying section (equivalent to the slit 6 of FIG. 6) is provided separately. That is, the solvent is applied to the support by a roll coater 22. In FIG. 7, parts corresponding functionally to those already described with reference to FIG. 7 are therefore designated by the same reference numerals or characters.

SPECIFIC EXAMPLE

A convention roll coater was used to apply a xylole solvent to one side of a polyethylene terephthalate support at a flow rate of 100 cc/m$^2$. The support was 38 micrometers in thickness and 500 mm in width. While the solvent remains on the support, the particles were removed therefrom with the dust removing apparatus of FIG. 7 using a xylole solvent. Thereafter, the coating apparatus 20 as shown in FIG. 5 was used to apply the magnetic coating solution to one side of the cleaned support 1 to thickness of 3 micrometers, 5 micrometers and 10 micrometers. The coated surface was then checked for defects such as pin holes and stripes.

In the dust removing apparatus, the rod 3 was made of carbide (WC-TAC) and had a diameter of 6 mm and a surface roughness of 0.5 micrometer, and it was rotated at a peripheral speed of 0.5 cm/sec. The xylole solvent was supplied to the slit 7 at a flow rate of 500 cc/min.

In the concrete example described above, the magnetic coating solution indicated in Table 1 was used. The results are as indicated in Table 3 below:

COMPARISON EXAMPLE

For a second comparison, the magnetic coating solution was applied to the support under the same conditions as those of the second specific example except that the solvent precoating operation and the dust removing apparatus were not employed. The coated but uncleaned surface was checked for defects such as pin holes and stripes. The results are as shown in Table 3 below:

TABLE 3

| | Dust removing apparatus | Defect | Coated magnetic layer thickness | | |
|---|---|---|---|---|---|
| | | | 3 μm | 5 μm | 10 μm |
| Specific example | Used | Stripes | 0 | 0 | 0 |
| | | Pin holes | 0.1 | 0.2 | 0 |
| Comparison example | Not used | Stripes | 10.2 | 6.5 | 4.8 |
| | | Pin holes | 85.1 | 41.3 | 35.3 |

Note
Both in the specific example and in the comparison example, ten supports each 4000 m long were used. In Table 3, the numerical data are the number of defects per support.

The invention provides many beneficial effects.

As was described above, the cylindrical surface of the rod 3 rotating in the direction B opposite to the direction A of running of the support 1 is brought into sliding contact with the surface of the support 1 from which dust should be removed. As a result large air speeds are generated in the atmosphere near the surface of the support. Therefore, the dust (particles) 18 floats from the surface of the support, thus being effectively transferred onto the surface of the rod 3.

A negative pressure is held in the slit 6 in the embodiment of FIG. 3. Therefore, the particles 18 transferred onto the surface of the rod 3 are separated therefrom and discharged through the slit.

The solvent is supplied into the slit 7. Therefore, some of the particles remaining on the surface of the rod are washed by the solvent and discharged to the outside. At the same time, the surface of the rod 3 is wetted with the solvent, and therefore the particles are more effectively transferred onto the surface of the rod 3. Thus, the dust can be removed from the support with high efficiency.

In the second example of the dust removing apparatus shown in FIG. 6, the solvent is supplied into both of the slits 6 and 7. Therefore, not only are the particles 18 washed away from the surface of the rod 3 by the solvent, but also the surface of the rod 3 is covered with the solvent. Accordingly, the particles can be more effectively transferred onto the surface of the rod 3. That is, the particles can be removed from the support with high reliability.

What is claimed is:

1. A cleaning apparatus for removing particles from a flexible sheet, comprising:
   means for running a flexible sheet in a first detection past a first position;
   a rotatable rod member disposed adjacent said flexible sheet at said first position;
   drive means for rotating said rod member at said first position in a direction opposite said first direction;
   a block having a vertical first slit holding a solvent and rotatably supporting said rod member at a top of said first slit; and
   means for supplying said solvent to said first slit,
   wherein said rod member has an outer circumferential surface comprising carbide of a surface roughness in a range from about 0.05 micrometers to 1 micrometers.

2. A cleaning apparatus as recited in claim 1, wherein said block further comprises a vertical second slit disposed adjacent said first direction.

3. A cleaning apparatus as recited in claim 2, further comprising means for applying a negative gas pressure to said second slit.

4. A cleaning apparatus as recited in claim 2, wherein said supplying means supplies said solvent to said second slit.

5. A cleaning apparatus as recited in claim 1, further comprising means disposed at a position located to a side of said block opposite said first direction for coating said flexible sheet with a solvent.

6. A cleaning apparatus as recited in claim 1:
   wherein said block further includes a first collector disposed in said first direction from said first slit for collecting said solvent from said first slit; and
   wherein said supply means receives said solvent collected by said first collector and further includes filtering means for said solvent.

7. A cleaning apparatus as recited in claim 6:
   wherein said block further includes a second collector disposed opposite said first direction from said first slit for collecting said solvent; and
   wherein said supplying means receives said solvent collected by said second collector.

8. A cleaning apparatus as recited in claim 1, wherein said rod member has an outside diameter in a range from 1 mm to 50 mm.

9. A cleaning apparatus as recited in claim 1, wherein said drive means comprises means for driving said rod member at a peripheral speed of at least 0.1 cm/sec.

10. A cleaning apparatus as recited in claim 1, wherein a clearance between said rod member and said flexible sheet is such that said rod removes substantially all of said solvent from said sheet.

* * * * *